(12) United States Patent
Johnson et al.

(10) Patent No.: US 7,448,636 B2
(45) Date of Patent: Nov. 11, 2008

(54) STABILIZER BAR

(75) Inventors: Chad A. Johnson, Royal Oak, MI (US);
Jeffrey L. Kincaid, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 447 days.

(21) Appl. No.: 11/251,369

(22) Filed: Oct. 14, 2005

(65) Prior Publication Data
US 2007/0085295 A1    Apr. 19, 2007

(51) Int. Cl.
B60G 21/055 (2006.01)
(52) U.S. Cl. .................. 280/124.152; 280/124.166; 280/124.177; 280/124.165
(58) Field of Classification Search .......... 280/124.152, 280/124.177, 124.165, 124.166, 124.13, 280/5.516; 403/345
See application file for complete search history.

(56) References Cited

U.S. PATENT DOCUMENTS

| | | | |
|---|---|---|---|
| 2,275,637 A | 3/1942 | McIntyre et al. | |
| 5,118,070 A * | 6/1992 | Reid | 248/635 |
| 5,190,269 A | 3/1993 | Ikeda et al. | |
| 5,224,790 A | 7/1993 | Hein | |
| 5,352,055 A | 10/1994 | Hellon et al. | |
| 5,588,209 A | 12/1996 | Fisher et al. | |
| 5,671,909 A | 9/1997 | Hamada et al. | |
| 5,857,800 A | 1/1999 | Nell | |
| 6,206,392 B1 | 3/2001 | Siecinski et al. | |
| 6,523,843 B2 | 2/2003 | Wiesemann et al. | |
| 6,685,381 B1 * | 2/2004 | Sugita et al. | 403/341 |
| 6,845,995 B2 * | 1/2005 | Cai et al. | 280/124.169 |
| 6,889,988 B2 * | 5/2005 | Cai et al. | 280/124.107 |
| 7,100,926 B2 | 9/2006 | Osterlanger et al. | |
| 7,188,851 B2 | 3/2007 | Furuyama et al. | |
| 2003/0111817 A1 | 6/2003 | Fader et al. | |
| 2003/0175073 A1 | 9/2003 | Funke | |
| 2004/0070161 A1 | 4/2004 | Fader | |
| 2004/0075235 A1 | 4/2004 | Cai et al. | |
| 2005/0029769 A1 | 2/2005 | Furuyama et al. | |

FOREIGN PATENT DOCUMENTS

DE    3904833 C1    3/1990

OTHER PUBLICATIONS

Translated DE3904833 document.*

* cited by examiner

*Primary Examiner*—Eric Culbreth
*Assistant Examiner*—Nicole Verley
(74) *Attorney, Agent, or Firm*—Harness, Dickey & Pierce, P.L.C.

(57) ABSTRACT

A suspension system having a stabilizer bar assembly with a stabilizer bar structure, an intermediate bushing and a resilient bushing. The stabilizer bar structure includes a center section to which the intermediate bushing is coupled. The resilient bushing is mounted on the intermediate bushing. The intermediate bushing limits relative axial movement of the resilient bushing in along the center section in a first direction and a second direction opposite the first direction. A method for forming a stabilizer bar assembly is also provided.

18 Claims, 3 Drawing Sheets

STABILIZER BAR

The present invention generally relates to stabilizer bars for vehicle suspensions and more particularly to a stabilizer bar with an improved mounting system for mounting the stabilizer bar to the vehicle frame.

Stabilizer bars, also known as sway bars or anti-roll bars, are employed in a vehicle suspension system to reduce a body roll in a vehicle during a turn. With reference to FIGS. 1 and 2, a prior art stabilizer bar can be formed of a solid or tubular material and includes a center section 110, first and second arms 112 and 114, respectively, that are coupled to the opposite ends of the center section 110, and first and second bushings 116 and 118, respectively. The first and second arms 112 and 114 can be configured to attach to left and right suspension members 120 and 122, respectively, while the first and second bushings 116 and 118 are configured rotatably mount the center section 110 to the vehicle frame 124.

Lateral forces exerted on the stabilizer bar during the operation of the vehicle tend to push the center section 110 in an axial direction and as such, the center section 110 of prior art stabilizer bars includes first and second thrust flanges 126 and 128, respectively, that are disposed adjacent the bushings and which are employed to retain the first and second bushings 116 and 118, respectively, in a desired location. The thrust flanges 126 and 128 can be of a formed metal (upset) type collar, a plastic injection molded type collar, a crimp type collar, a multi-piece wedge type collar or a weld-type collar.

One drawback associated with this configuration is that the thrust flanges 126 and 128 must be positioned in a manner that inhibits an undesired amount of lateral movement while not interfering with the rotation of the center section 110. Given normal manufacturing variation with, for example, the location of the mounting holes in the suspension component, the location of the mounting holes in the vehicle frame 124, the overall length of the center section 110, the length of the first and second arms 112 and 114, and the accuracy and repeatability with which the thrust flanges 126 and 128 may be fixedly secured to the center section 110, it can be challenging to accurately place the first and second thrust flanges 126 and 128 in a manner that provides satisfactory performance and yet may be utilized with components across the broad spectrum of manufacturing tolerances.

SUMMARY

In one form, the present teachings provide a vehicle suspension system with a stabilizer bar assembly having a bar structure, an intermediate bushing, a first bushing and a second bushing. The bar structure includes a center section and first and second arms that are disposed on opposite sides of the center section. The intermediate bushing is coupled to the center section and has a locating collar. The first and second bushings are at least partially formed of a resilient material. The first bushing is disposed over the locating collar and the second busing is mounted on the center section axially spaced apart from the first bushing. The locating collar limits movement of the first bushing along an axis of the center section in a first direction that is parallel to the axis of the center section and a second direction that is opposite the first direction.

In another form, the present teachings provide a vehicle suspension system with a stabilizer bar assembly having a bar structure, an intermediate bushing, a first bushing and a second bushing. The bar structure can include a center section and first and second arms that are disposed on opposite sides of the center section. The intermediate bushing is coupled to the center section. The first bushing is disposed over the intermediate bushing, while the second busing is mounted on the center section axially spaced apart from the first bushing. The intermediate bushing limits movement of the first bushing along an axis of the center section in a first direction that is parallel to the axis of the center section and a second direction that is opposite the first direction.

In yet another form, the present teachings provide a method for forming a stabilizer bar. The method can include: forming a bar structure with a center section; forming an intermediate bushing onto the center section, the intermediate bushing having at least one locating collar; and assembling a resilient bushing to the intermediate bushing such that the at least one collar limits relative axial movement of the resilient bushing along the center section in a first direction and a second direction opposite the first direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
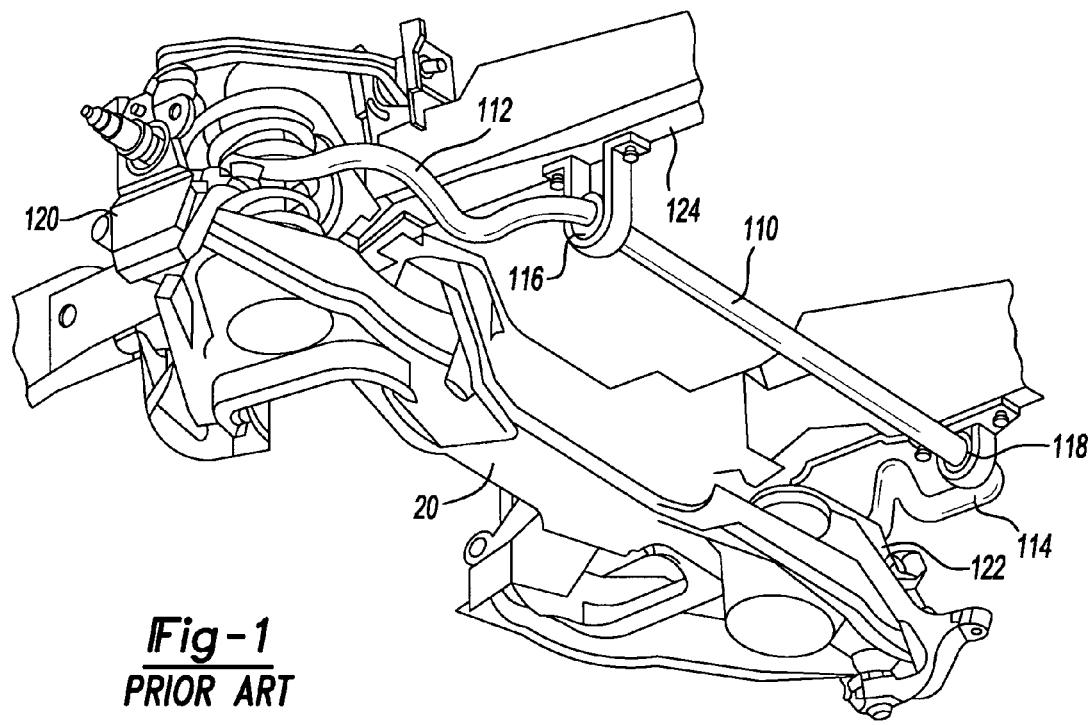
FIG. 1 is a perspective view of a portion of a vehicle with a suspension system utilizing a prior art stabilizer bar assembly.
Figure 2:
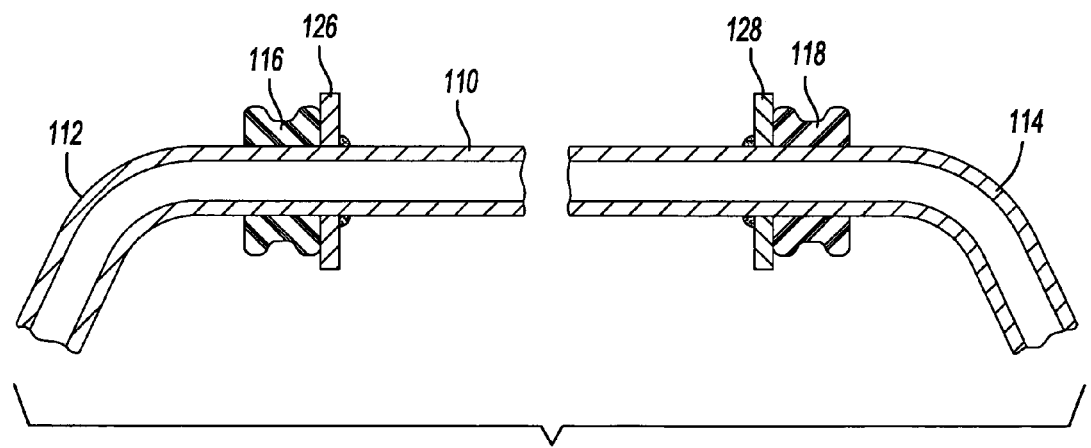
FIG. 2 is a sectional view of a portion of the stabilizer bar of FIG. 1.
Figure 3:
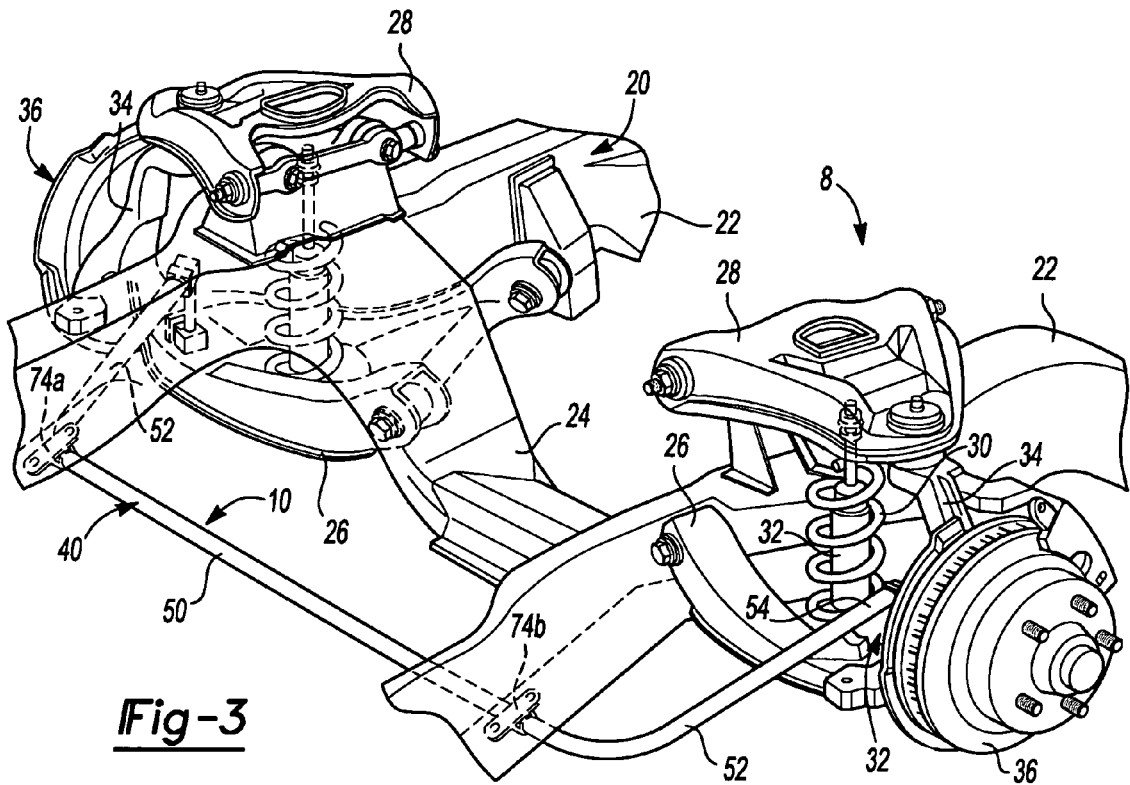
FIG. 3 is a perspective view of a portion of a vehicle with a suspension system utilizing a stabilizer bar assembly constructed in accordance with the teachings of the present invention.

With reference to FIG. 3 of the drawings, a suspension system 8 is illustrated to have a stabilizer bar assembly 10 constructed in accordance with the teachings of the present invention. In the particular example provided, the suspension system 8 is an independent front wheel suspension system of the type having upper and lower control arms and a strut assembly at each wheel that is suspended from the vehicle frame. Reference will be made to a vehicle frame in the present disclosure, but those of ordinary skill in the art will recognize that many current vehicles do not have a frame per se, but instead have regions of the body which act as an integrated frame structure. With this in mind, the frame 20 is shown to partially include a pair of longitudinally extending side rails 22 and a crossbeam 24.

The suspension system 8 includes a lower control arm 26 and an upper control arm 28, both of which being pivotally attached to the frame 20. A strut assembly having a helical coil spring 30 and a strut damper 32 is retained between an intermediate portion of the lower control arm 26 and the frame 20 to support the weight of the vehicle and any loads which are transmitted through the lower control arm 26. The upper control arm 28 is connected to the lower control arm 26 by a steering knuckle 34. A hub and a rotor assembly 36 are rotatably attached to a spindle portion (not shown) of a steering knuckle 34 such that a wheel and a tire may be mounted thereon.

Figure 4:
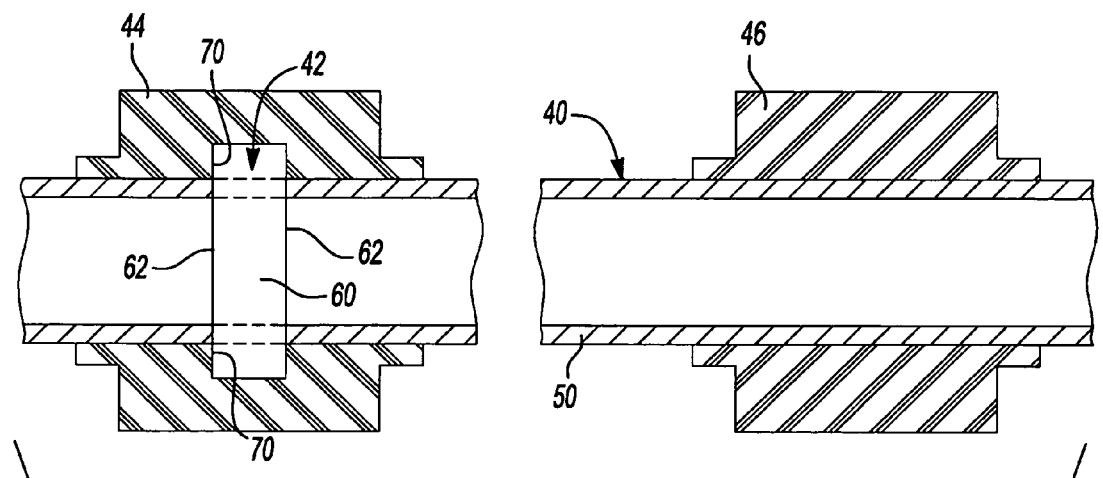
FIG. 4 is a section view of a portion of the stabilizer bar of FIG. 3.

With additional reference to FIG. 4, the stabilizer bar assembly 10 can include a stabilizer bar structure 40, an intermediate bushing 42 and first and second resilient bushings 44 and 46, respectively. The stabilizer bar structure 40 can include an elongated central section 50 and a pair of arm members 52 that are disposed on opposite sides of the central section 50. The distal end 54 of each of the arm members 52 can be connected to a corresponding one of the lower control arms 26 in a conventional manner. Examples of suitable connection methods are described in U.S. Pat. No. 5,954,353 entitled "Plug In Direct Acting Stabilizer Bar Link"; U.S. Pat. No. 6,007,079 entitled "Direct Acting End Link For Stabilizer Bar"; U.S. Pat. No. 6,007,080 entitled "Plug In Direct Acting Stabilizer Bar Link"; U.S. Pat. No. 6,254,114 entitled "Composite Stabilizer Bar Link"; and U.S. Pat. No. 6,308,972 entitled "Self-Locking Plug-In Stabilizer Bar Link Mechanism", the disclosures of which are hereby incorporated by reference as if fully set forth herein in their entirety.

Figure 5:
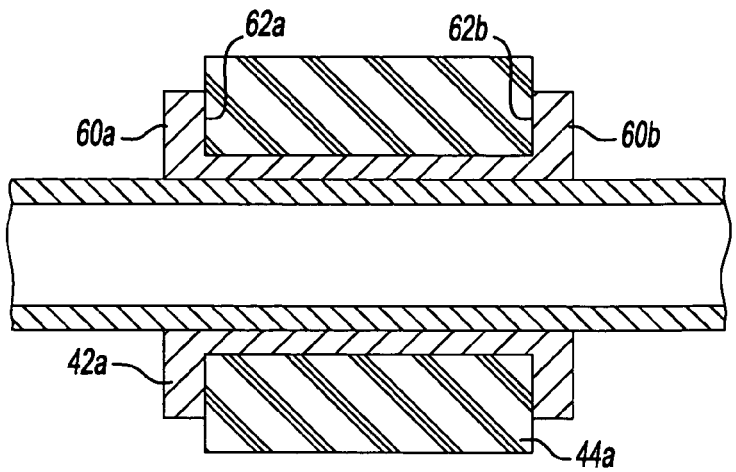
FIG. 5 is a longitudinal sectional view of a portion of a second stabilizer bar assembly constructed in accordance with the teachings of the present invention.

The intermediate bushing 42 can include at least one locating collar 60 and can be coupled to the central section 50 at a location where the first resilient bushing 44 is to be placed. The intermediate bushing 42 includes two distinct thrust surfaces 62 that are configured to cooperate to limit relative axial movement of the first resilient bushing 44 along the central section 50. In the particular example provided, the thrust surfaces 62 are formed on the opposite lateral surfaces of the locating collar 60. It will be appreciated, however, that the intermediate bushing 42a may employ two or more spaced apart locating collars 60a as is shown in FIG. 5 to limit relative axial movement of the first resilient bushing 44a. In this regard, each of the locating collars 60a is employed to restrain relative axial movement of the resilient bushing 44a in response to the application of a thrust load against one set of thrust surfaces, e.g., thrust surface 62a is operable for resisting thrust loads in a first axial direction, while thrust surface 62b is operable for resisting thrust loads in a second axial direction opposite the first axial direction.

Returning to FIGS. 3 and 4, the intermediate bushing 42 can be formed of a plastic material, such as an injection moldable polymer, and in the example provided is molded onto the central section 50 at a desired location after the formation of one or both of the arm members 52. The polymer material is advantageous in that it provides a smooth and consistent interface with the first resilient bushing.

The first resilient bushing 44 can be assembled to the central section 50 (e.g., prior to formation of the arm members 52 and the intermediate bushing 42) and pushed axially over the intermediate bushing 42 such that the first resilient bushing 44 is engaged to the at least one locating collar 60. In the example provided, the first resilient bushing 44 is received over the intermediate bushing 42 and is configured to engage the opposite thrust surfaces 62 that are formed on the locating collar 60. Accordingly, contact between the thrust surfaces 62 and corresponding surfaces 70 formed on the first resilient bushing 44 limit relative axial movement of the first resilient bushing along the central section 50.

The second resilient bushing 46 can also be assembled to the central section 50 (e.g., prior to formation of the arm members 52 and the intermediate bushing 42) and pushed into a desired location. Unlike the arrangement for the first resilient bushing 44, the second resilient bushing 46 is "free floating" and can be translated along the central section 50.

A pair of mounting brackets 74a and 74b can be employed to rotatably attach the central section 50 to the frame 20. The mounting brackets 74a and 74b are conventional in their construction and operation and need not be discussed in significant detail herein. Briefly, each of the mounting brackets 74a and 74b is mounted about an associated one of the first and second resilient bushings 44 and 46 and thereafter aligned to mating holes (not specifically shown) in the frame 20. Note that when the mounting bracket 74b is to be aligned to the mating holes in the frame 20, the second resilient bushing 46 may be readily moved in an axial direction along the central section 50. Threaded fasteners (not specifically shown) can be employed to secure the mounting brackets 74a and 74b to the frame 20. As the mounting brackets 74a and 74b engage the first and second resilient bushings 44 and 46, movement of the first and second resilient bushings 44 and 46 relative to the frame 20 is inhibited. Furthermore, as the thrust surfaces 62 of the locating collar 60 are disposed between the corresponding surfaces 70 formed on the first resilient bushing 44, movement of the central section 50 in an axial direction relative to the first resilient bushing 44 and the frame 20 is limited.

Figure 6:
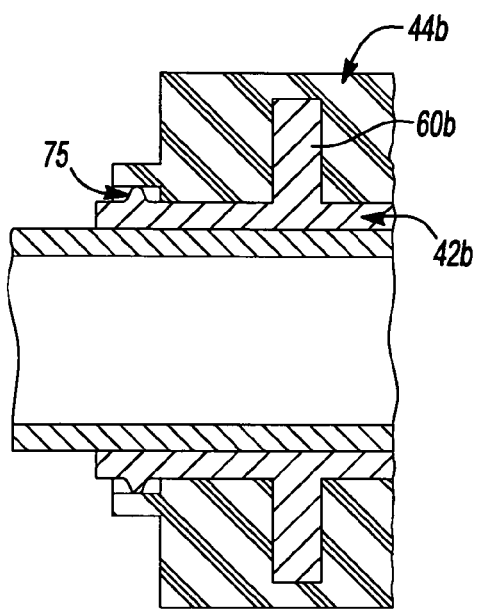
FIG. 6 is a longitudinal sectional view of a portion of a third stabilizer bar assembly constructed in accordance with the teachings of the present invention.

Those of ordinary skill in the art will appreciate from this disclosure that the use of an intermediate bushing permits additional functionality to be incorporated into the intermediate bushing/first resilient bushing arrangement. In the example of FIG. 6, the first resilient bushing 44b is configured to sealingly engage the intermediate bushing 42b at locations outboard of the locating collar 60b so that a seal 75 is formed therebetween. Configuration in this manner is advantageous in that it inhibits ingress of contaminants, such as water, dirt and debris, between the intermediate bushing 42b and the interior of the first resilient bushing 44b.

Figure 7:
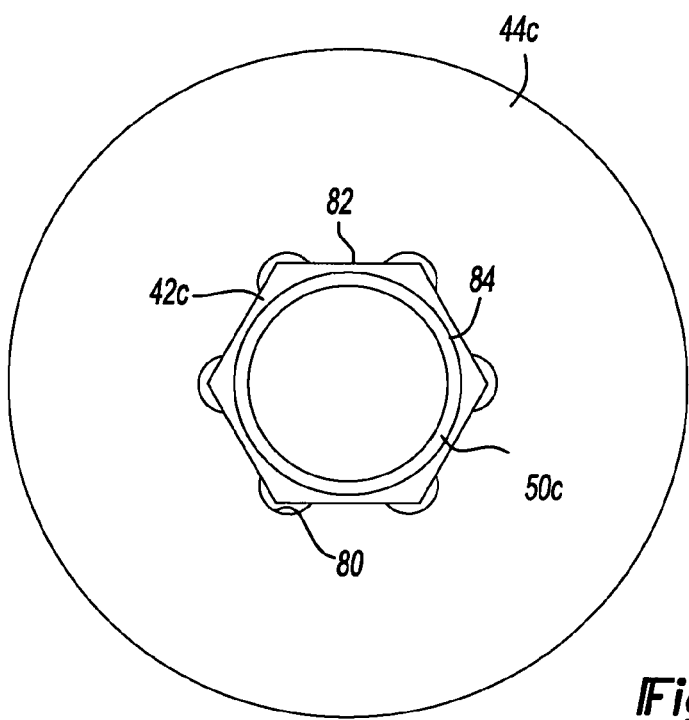
FIG. 7 is a sectional view of a portion of a fourth stabilizer bar assembly constructed in accordance with the teachings of the present invention.

In yet another embodiment, which is illustrated in FIG. 7, one or more of the interior surface 80 of the first resilient bushing 44c, the exterior 82 of all or a portion of the intermediate bushing 42c and the exterior surface 84 of the central section 50c may be formed with a non-circular cross-section. In the particular example provided, the aperture 82 through of the first resilient bushing 44c is formed such that it has hexagon-shaped cross-section, while the intermediate bushing 42c has a correspondingly shaped hexagon-shaped cross-section. Accordingly, rotation of the central section 50c relative to the first resilient bushing 44c causes the first resilient bushing 44c to act as a torsion spring.

While the intermediate bushing 42 has been described herein as being formed of plastic and molded onto the central section 50 of the stabilizer bar structure 40, those of ordinary skill in the art will appreciate that the intermediate bushing 42 may be formed in numerous other ways. For example the intermediate bushing 42 (or portions thereof) may be formed of an appropriate metal or plastic material and bonded (e.g., via an adhesive) to the central section 50, or from an appropriate metal and brazed or welded (e.g., via arc, TIG, MIG, spot/resistance, and/or friction/spin welding) to the central section 50, or from an appropriate metal or plastic and press-fit to the central section 50, or formed from an appropriate metal or plastic and fixedly coupled to the central section 50 via pins, threads, threaded fasteners, rivets, etc., or formed from the central section 50 in a forming operation (e.g., forging, spinning, rolling, hydroforming).

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A vehicle suspension system comprising a stabilizer bar assembly having a bar structure, an intermediate bushing, a first bushing and a second bushing, the bar structure including a center section and first and second arms that are disposed on opposite sides of the center section, the intermediate bushing being coupled to the center section and having a locating collar that is disposed at a first location, the first and second bushings being at least partially formed of a resilient material, the first bushing being disposed over the locating collar and the second busing being mounted on the center section axially spaced apart from the first bushing, wherein the locating collar limits movement of the first bushing relative to the center section along an axis of the center section in a first direction that is parallel to the axis of the center section and a second direction that is opposite the first direction and wherein the first bushing extends around the locating collar and directly contacts the center section of the bar structure on opposite lateral sides of the locating collar and wherein the second bushing is slidably disposed on the bar structure at a second location and no structure is formed on the bar structure to maintain the second bushing at the second location such that the second bushing can be axially slid toward or away from the locating collar when the second bushing is positioned in the second location.

2. The vehicle suspension system of claim 1, wherein the locating collar is formed of a plastic material.

3. The vehicle suspension system of claim 2, wherein the locating collar is molded onto the center section.

4. The vehicle suspension system of claim 1, wherein the locating collar is integrally formed with an intermediate bushing.

5. The vehicle suspension system of claim 4, wherein the locating collar has a length that is shorter than a length of the first bushing.

6. The vehicle suspension system of claim 4, further comprising a seal located at an end of the first bushing and creating a seal between the locating collar and the first bushing to inhibit ingress of a contaminant between the first bushing and the locating collar.

7. The vehicle suspension system of claim 6, wherein the seal includes an annular ridge formed on the intermediate bushing and an annular structure that extends from the first bushing in an axial direction concentric with the bar structure.

8. The vehicle suspension system of claim 1, wherein the locating collar has a diameter that is larger than a diameter of an adjacent portion of the center section.

9. The vehicle suspension system of claim 1, wherein the first bushing has a through-hole and wherein at least one of the through-hole, the intermediate bushing and the center section is formed with non-round cross section so that the first bushing acts as a torsion spring to resist rotation of the center section.

10. A vehicle suspension system comprising a stabilizer bar assembly having a bar structure, an intermediate bushing, a first bushing and a second bushing, the bar structure including a center section and first and second arms that are disposed on opposite sides of the center section, the intermediate bushing being coupled to the center section at a first location, the first bushing being disposed over the intermediate bushing and the second busing being mounted on the center section axially spaced apart from the first bushing, wherein the intermediate bushing limits movement of the first bushing relative to the center section along an axis of the center section in a first direction that is parallel to the axis of the center section and a second direction that is opposite the first direction and wherein the first bushing extends around the intermediate bushing and directly contacts the center section of the bar structure and wherein the second bushing is slidably disposed on the bar structure at a second location and no structure is formed on the bar structure to maintain the second bushing at the second location such that the second bushing can be axially slid toward or away from the locating collar when the second bushing is positioned in the second location.

11. The vehicle suspension system of claim 10, wherein the intermediate bushing is formed of a plastic material.

12. The vehicle suspension system of claim 11, wherein the intermediate bushing is molded onto the center section.

13. The vehicle suspension system of claim 12, wherein the intermediate bushing is integrally formed with at least one locating collar.

14. The vehicle suspension system of claim 13, wherein the first bushing is disposed over the locating collar.

15. The vehicle suspension system of claim 13, wherein the locating collar has a diameter that is larger than a diameter of an adjacent portion of the center section.

16. The vehicle suspension system of claim 10, further comprising a seal located at an end of the first bushing and creating a seal between the intermediate bushing and the first bushing to inhibit ingress of a contaminant between the first bushing and the intermediate bushing.

17. The vehicle suspension system of claim 16, wherein the seal includes an annular ridge formed on the intermediate bushing and an annular structure that extends from the first bushing in an axial direction concentric with the bar structure.

18. The vehicle suspension system of claim 10, wherein the first bushing has a through-hole and wherein at least one of the through-hole, the intermediate bushing and the center section is formed with non-round cross section so that the first bushing acts as a torsion spring to resist rotation of the center section.

* * * * *